(12) United States Patent
Toda et al.

(10) Patent No.: US 10,614,160 B2
(45) Date of Patent: Apr. 7, 2020

(54) COMPUTER-READABLE RECORDING MEDIUM RECORDING LEARNING PROGRAM, LEARNING METHOD, AND LEARNING APPARATUS

(71) Applicant: FUJITSU LIMITED, Kawasaki-shi, Kanagawa (JP)

(72) Inventors: Takamichi Toda, Kawasaki (JP); Ryuichi Takagi, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/967,653

(22) Filed: May 1, 2018

(65) Prior Publication Data
US 2018/0336179 A1    Nov. 22, 2018

(30) Foreign Application Priority Data
May 16, 2017    (JP) .............................. 2017-097442

(51) Int. Cl.
| | | |
|---|---|---|
| *G06F 17/28* | (2006.01) | |
| *G10L 19/12* | (2013.01) | |
| *G10L 21/00* | (2013.01) | |
| *G06F 17/27* | (2006.01) | |
| *G06N 3/08* | (2006.01) | |
| *G06N 20/00* | (2019.01) | |
| *G06N 3/04* | (2006.01) | |

(52) U.S. Cl.
CPC ...... *G06F 17/2755* (2013.01); *G06F 17/2809* (2013.01); *G06F 17/2836* (2013.01); *G06N 3/0445* (2013.01); *G06N 3/0454* (2013.01); *G06N 3/08* (2013.01); *G06N 3/084* (2013.01); *G06N 20/00* (2019.01)

(58) Field of Classification Search
CPC .. G06F 15/18; G06F 17/2755; G06F 17/2809; G06F 17/2836; G06F 19/24; G06N 20/00; G06N 3/08
USPC ................................. 704/2, 4, 8, 9, 10, 259
See application file for complete search history.

(56) References Cited

U.S. PATENT DOCUMENTS

| | | | |
|---|---|---|---|
| 5,825,645 A | 10/1998 | Konar et al. | |
| 8,977,537 B2 * | 3/2015 | Burges | G06F 17/2818 |
| | | | 704/9 |
| 10,140,581 B1 * | 11/2018 | Kiss | G06N 5/022 |
| 2009/0210218 A1 * | 8/2009 | Collobert | G06F 17/277 |
| | | | 704/9 |
| 2012/0330647 A1 * | 12/2012 | Burges | G06F 17/277 |
| | | | 704/9 |
| 2016/0196258 A1 * | 7/2016 | Ma | G06F 17/2785 |
| | | | 704/8 |

(Continued)

FOREIGN PATENT DOCUMENTS

| | | |
|---|---|---|
| JP | 6-028332 | 2/1994 |
| JP | 7-191967 | 7/1995 |
| JP | 8-221378 | 8/1996 |

*Primary Examiner* — Khai N. Nguyen
(74) *Attorney, Agent, or Firm* — Fujitsu Patent Center

(57) ABSTRACT

A non-transitory computer-readable recording medium having stored therein a learning program for causing a computer to execute a process includes: receiving a first sentence expressed in a first language and a second sentence obtained by translating the first sentence; and training a conversion parameters configured to convert each word of a received first sentence into a corresponding word of a received second sentence by utilizing machine learning.

12 Claims, 15 Drawing Sheets

(56) References Cited

U.S. PATENT DOCUMENTS

2017/0060854 A1* 3/2017 Zeng .................. G06F 17/2705
2017/0308526 A1* 10/2017 Uchiyama ........... G06F 17/2818
2018/0336179 A1* 11/2018 Toda .................. G06F 17/2755

* cited by examiner

FIG. 8

| INPUT SENTENCE ID | SENTENCE | CLASSIFICATION |
|---|---|---|
| input01 | 彼は教師です。 | INPUT |
| input02 | 彼は先生です。 | INPUT |
| output01 | He is a teacher. | OUTPUT |
| output02 | He is a teacher. | OUTPUT |

FIG. 9

| PHRASE ID | PHRASE | CLASSIFICATION |
|---|---|---|
| input01 | "彼", "は", "教師", "です", "。" | INPUT |
| input02 | "彼", "は", "先生", "です", "。" | INPUT |
| output01 | "He", "is", "a", "teacher", "." | OUTPUT |
| output02 | "He", "is", "a", "teacher", "." | OUTPUT |

COMPUTER-READABLE RECORDING MEDIUM RECORDING LEARNING PROGRAM, LEARNING METHOD, AND LEARNING APPARATUS

CROSS-REFERENCE TO RELATED APPLICATION

This application is based upon and claims the benefit of priority of the prior Japanese Patent application No. 2017-097442, filed on May 16, 2017, the entire contents of which are incorporated herein by reference.

FIELD

The present invention relates to a computer-readable recording medium recording a learning program, a learning method, and a learning apparatus.

BACKGROUND

In the field of natural language processing, machine learning such as a neural network has been employed. In addition, a method of performing a predicted control using a neural network has been developed.

As a method of performing search or classification of sentences in the field of natural language processing, a recurrent neural network (RNN) autoencoder which is an example of the neural network has been developed. The RNN autoencoder (RNNA) performs training by setting the same data in the input and the output without using training data to obtain a feature quantity of a sentence such as a compressed representation.

Patent Document 1: Japanese Laid-open Patent Publication No. 08-221378
Patent Document 2: Japanese Laid-open Patent Publication No. 07-191967
Patent Document 3: Japanese Laid-open Patent Publication No. 06-28332

SUMMARY

According to an aspect of the embodiments, there is provided a non-transitory computer-readable recording medium having stored therein a learning program for causing a computer to execute a process including: receiving a first sentence expressed in a first language and a second sentence obtained by translating the first sentence; and training conversion parameters for converting each word of a received first sentence into a corresponding word of a received second sentence by utilizing machine learning.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an exemplary sentence read by a sentence receiver according to the embodiment;
FIG. 9 is a diagram illustrating a result of performing a morphological analysis on a vector converter according to the embodiment.

DESCRIPTION OF EMBODIMENTS

Figure 1:
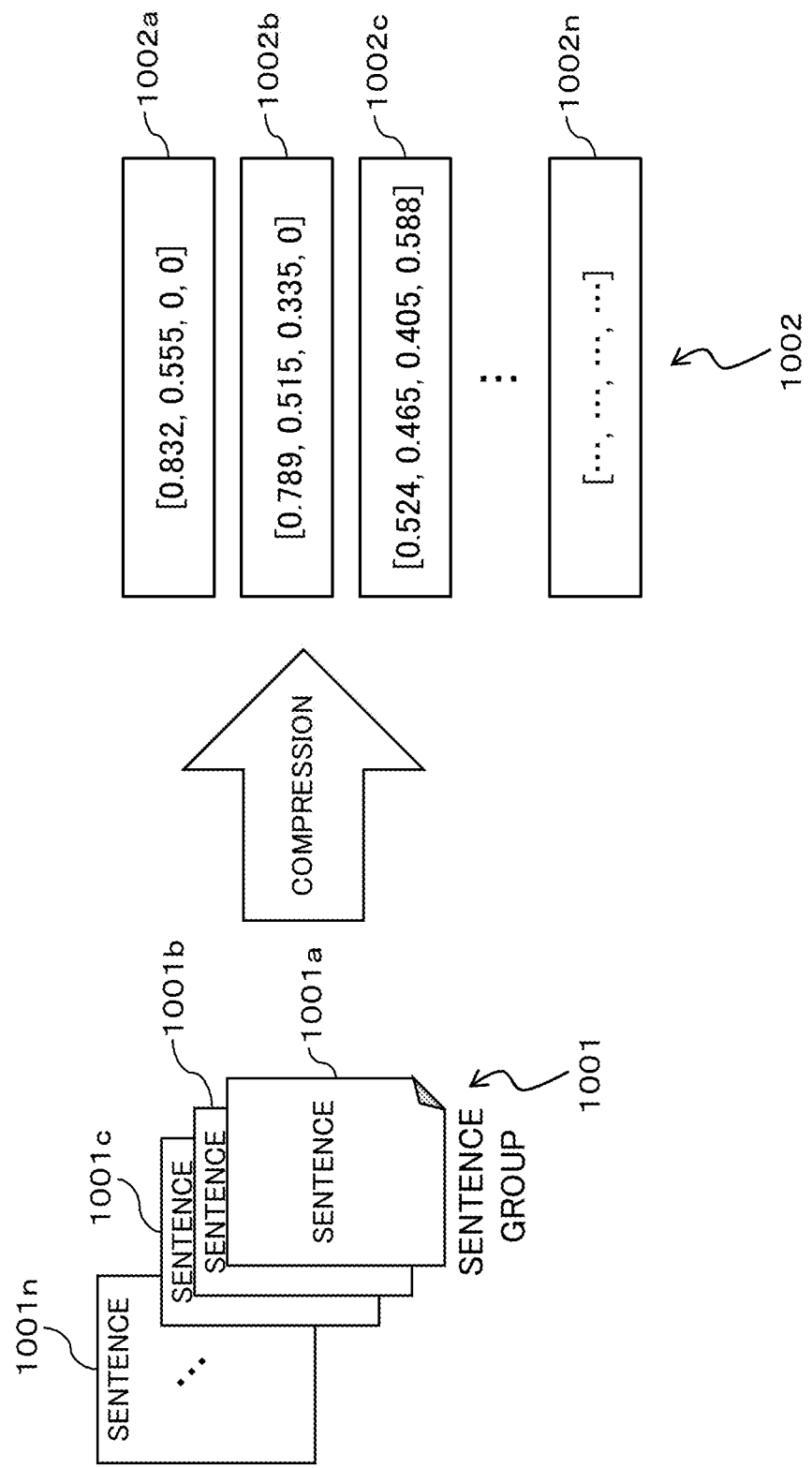
FIG. 1 is a diagram illustrating sentence vectorization according to a comparative example of an embodiment.

Embodiments of the invention will now be described with reference to the accompanying drawings. Note that the following embodiments are merely for illustrative purposes and are not intended to exclude various modifications or applications unless specified otherwise. For example, the embodiment may have various modifications without departing from the spirit and scope of the invention. Note that like reference numerals denote like elements throughout the drawings used in conjunction with the following embodiments unless specified otherwise.

[1] Embodiment

In a language/expression system such as Japanese, for example, there are a plurality of words for expressing a specific meaning, and notations such as Hiragana, Katakana, and Kanji are mixed. For example, if an English word "teacher" can be expressed as a plurality of Japanese words such as "kyoshi", "sensei", and "sensei". Hereinafter, in a case where there are a plurality of expressions representing a specific meaning, this will be referred to as "ambiguity of expression". For example, in a case where a language having such "ambiguity of expression" is used in the input data, a feature quantity of a sentence is influenced by the ambiguity of expression, so that accuracy of search or classification of the sentence may be degraded.

[1-1] RNN of Comparative Example

First, a method of searching or classifying a sentence according to a comparative example of an embodiment will be described with reference to FIG. 1. Note that the following method may be performed, for example, by a computer.

In the field of natural language processing, in order to perform classification or search of a sentence, first, a plurality of sentences 1001a to 1001n (where "n" denotes an integer) included in a sentence group 1001 are vectorized into vectors 1002a to 1002n (where "n" denotes an integer) as illustrated in FIG. 1. The "vector" may also be referred to as a "compressed representation". The "vector" or "compressed representation" of a sentence is an example of a "feature quantity" which is an index representing a feature of the sentence.

As illustrated in FIG. 1, the sentences 1001a and 1001b are vectorized into [0.832, 0.555, 0, 0] (vector 1002a) and [0.789, 0.515, 0.335, 0] (vector 1002b). In addition, the sentence 1001c is vectorized into [0.524, 0.465, 0.405, 0.588] (vector 1002c).

Then, in order to compare the sentences 1001a to 1001n, the computer calculates similarity between vectors 1002a to 1002n and performs search or classification of the sentences 1001a to 1001n based on the calculated similarity. Here, it is assumed that the sentence 1001a is classified into a group where the sentence 1001b or 1001c belongs by way of example.

In order to determine whether the sentence 1001a is classified into a group where the sentence 1001b belongs or a group where the sentence 1001c belongs, the computer calculates a similarity between the sentences 1001a and 1001b and a similarity between the sentences 1001a and 1001c. Here, it is assumed that a cosine (cos) similarity based on a vector of the sentence is used in calculation of the similarity of sentence by way of example.

The cosine similarity may be calculated, for example, based on the following Formula (1). Note that, in the following Formula (1), "q" and "d" denote sentence vectors. As the sentences are more similar, the cosine similarity approaches "1". As the sentences are more dissimilar, the cosine similarity approaches "−1". "|V|" denotes the number of phrases in the vectors "q" and "d". For example, the computer may classify documents having the cosine similarities closest to "1" into the same group.

$$\cos(q,d) = q \cdot d = \Sigma |V| i = 1 (q_i d_i) \qquad (1)$$

In the example of FIG. 1, the similarity between the sentences 1001a and 1001b is calculated as "(0.832×0.789)+(0.555×0.515)+(0×0.33)+(0×0)≈0.942" using the vectors 1002a and 1002b. Meanwhile, the similarity between the sentences 1001a and 1001c is calculated as "(0.832×0.524)+(0.555×0.465)+(0×0.405)+(0×0.588)≈0.694" using the vectors 1002a and 1002c. Comparing both similarities, a relationship "0.942>0.694" is obtained. Since "0.942" is closer to "1", the computer determines that the sentence 1001a is similar to the sentence 1001b, and classifies the sentence 1001a into a group where the sentence 1001b belongs.

In this manner, the computer may acquire the vectors 1002a to 1002n by vectorizing the sentence group 1001 and compare the vectors 1002a to 1002n of the sentences instead of the sentences 1001a to 1001n themselves in order to perform classification or search of the sentence.

Next, training of sentences using the RNN 1100 will be described with reference to a comparative example of FIG. 2. The RNN 1100 may perform training in consideration of a chronological order of the sentences.

Figure 2:
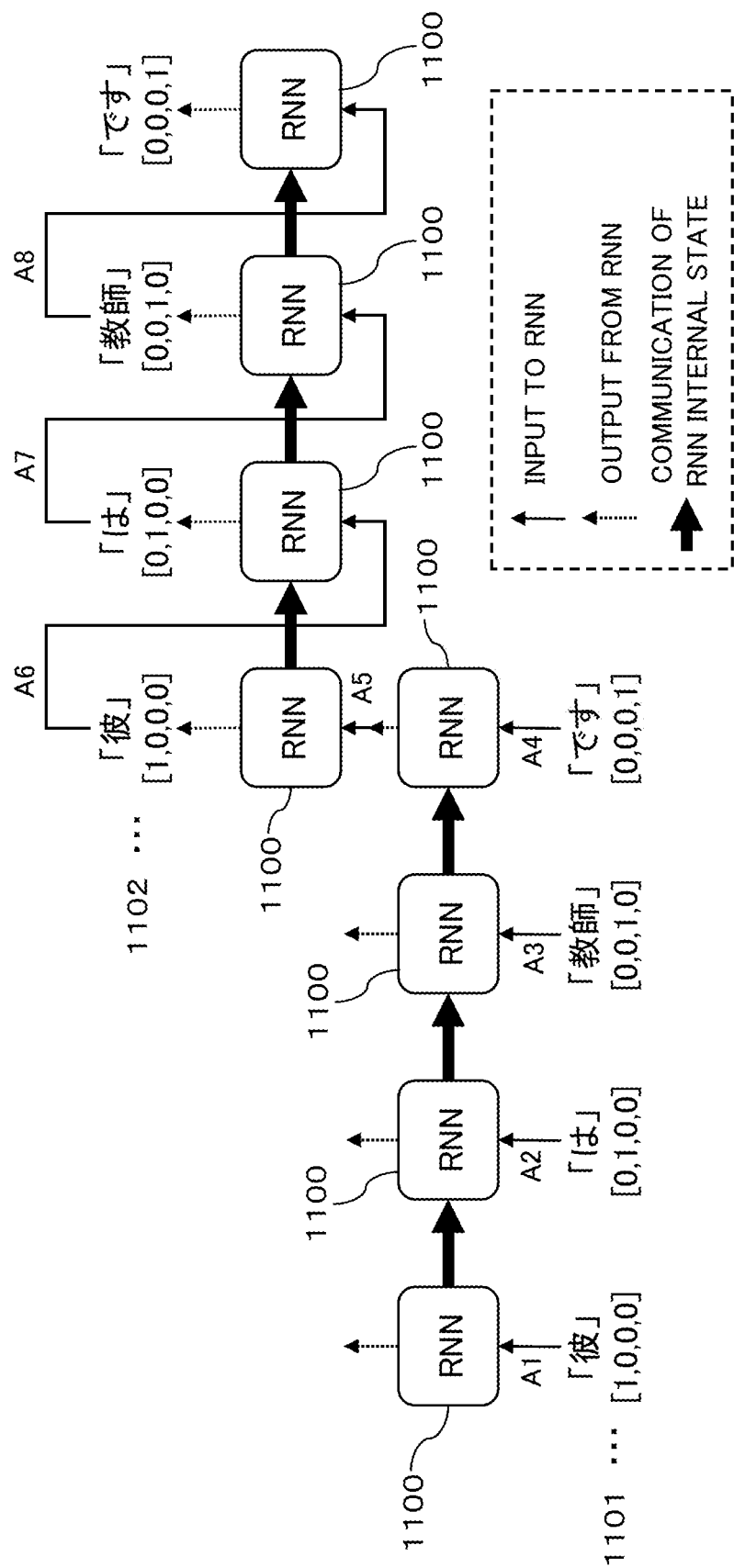
FIG. 2 is a diagram illustrating input and output values of an RNN according to a comparative example of the embodiment.

The example of FIG. 2 illustrates input and output values when the RNN trains a sentence "kare wa kyoshi desu.". The character data in FIG. 2 includes Japanese Kanji and Hiragana characters representing "kare", "wa", "kyoshi" and "desu" in Japanese. Note that it is assumed that the "RNN 1100" of FIG. 2 refers to the entire RNN. In addition, although FIG. 2 illustrates a plurality of RNNs 1100, all of them have the same structure. That is, in the example of FIG. 2, phrases of the sentence are sequentially input to and output from a single RNN 1100.

The input data 1101 of the RNN 1100 may be obtained by performing a morphological analysis on a sentence to be trained using the computer, extracting phrases of this sentence (for example, words), and vectorizing the extracted phrases. In the example of FIG. 2, in order to allow the RNN 1100 to train the sentence "kare wa kyoshi desu.", the computer performs a morphological analysis on this sentence and extracts phrases "kare", "ha", "kyoshi", and "desu" exhibited in this sentence. In addition, the computer vectorizes each of the extracted phrases. For example, assuming a one-hot technique is employed as a vectorization method, the extracted phrases are vectorized as follows as illustrated in FIG. 2.

"kare": [1, 0, 0, 0],
"ha": [0, 1, 0, 0],
"kyoshi": [0, 0, 1, 0],
"desu": [0, 0, 0, 1]

The vectors obtained as described above are set as the input data 1101 of the RNN 1100 as illustrated in FIG. 2. In addition, since the RNN 1100 performs training by setting the same value in both the input data 1101 and the output data 1102, the same vector as that of the input data 1101 is set in the output data 1102 of the RNN 1100. Furthermore, each input data 1101 is input to the RNN 1100 in order of "A1, A2, . . . , A8" (refer to the arrows A1 to A8 indicated by solid lines in FIG. 2). Inside the RNN 1100, the training is repeated such that the input data 1101 and the output data 1102 become the same data (for example, the same value). In addition, the arrows indicated by the dotted lines in FIG. 2 represent the output values from the RNN 1100 for each input data 1101. The training is performed by internally transferring the output values and the like inside the RNN 1100 (refer to the arrows indicated by the bold lines in FIG. 2).

Figure 3:
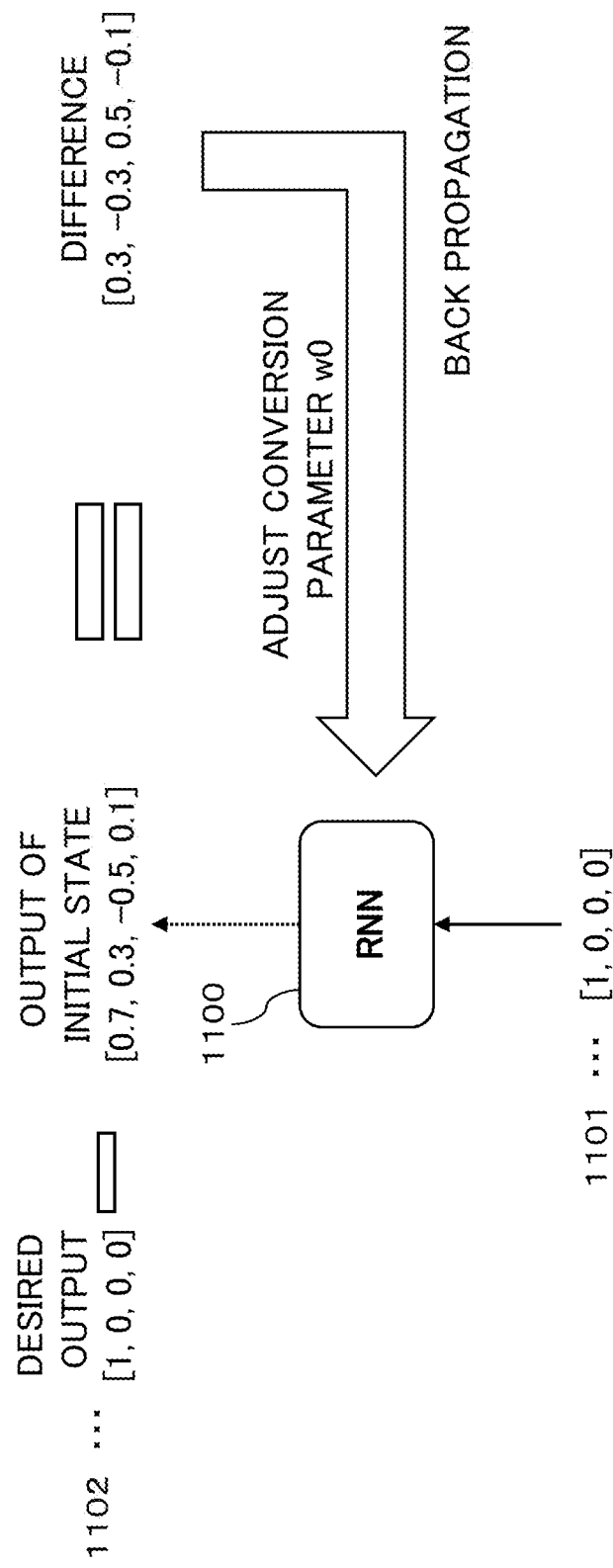
FIG. 3 is a diagram illustrating training based on back propagation in the RNN according to a comparative example of the embodiment.

FIG. 3 illustrates the training based on back propagation by extracting a single node of the RNN 1100 in the comparative example of FIG. 2.

In the example of FIG. 3, as a vector [1, 0, 0, 0] is set as the input data 1101 of the RNN 1100, a vector [0.7, 0.3, −0.5, 0.1] is obtained as an initial state output 1102. In the RNN 1100, the neural network is initialized by a random conversion parameter w0 (initial value) before the training. However, a desired output data [1, 0, 0, 0] is not obtained while the conversion parameter is set to an initial value. In this regard, in order to obtain a desired input/output relationship and suitably adjust the conversion parameter w0, the RNN 1100 performs iterative training based on a difference between the output data 1102 and the input data 1101 using back propagation. Note that the desired output data may include "data having the same value as that of the input data 1101" in the comparative example.

Figure 4:
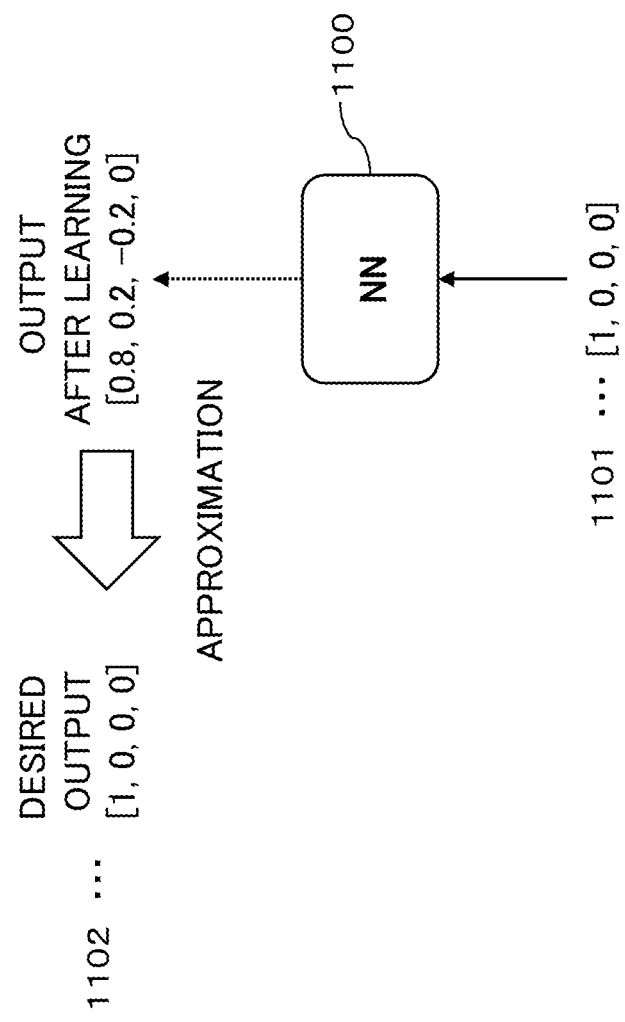
FIG. 4 is a diagram illustrating training in the RNN according to a comparative example of the embodiment.

FIG. 4 illustrates training of the RNN 1100 according to the comparative example of FIG. 3. If the training based on back propagation illustrated in FIG. 3 is iteratively performed, the output from the RNN 1100 approaches the desired output 1102. In addition, the desired output data 1102 corresponding to the input data 1101 (for example, the output data 1102 having the same value as that of the input data 1101) is obtained by suitably adjusting the conversion parameter w0.

Next, a method of acquiring a compressed representation of a sentence using the RNN autoencoder 1200 will be described with reference to the comparative example of FIG.

5. The character data in FIG. 5 includes Japanese Kanji and Hiragana characters representing "kare", "wa", "kyoshi" and "desu" in Japanese.

Figure 5:
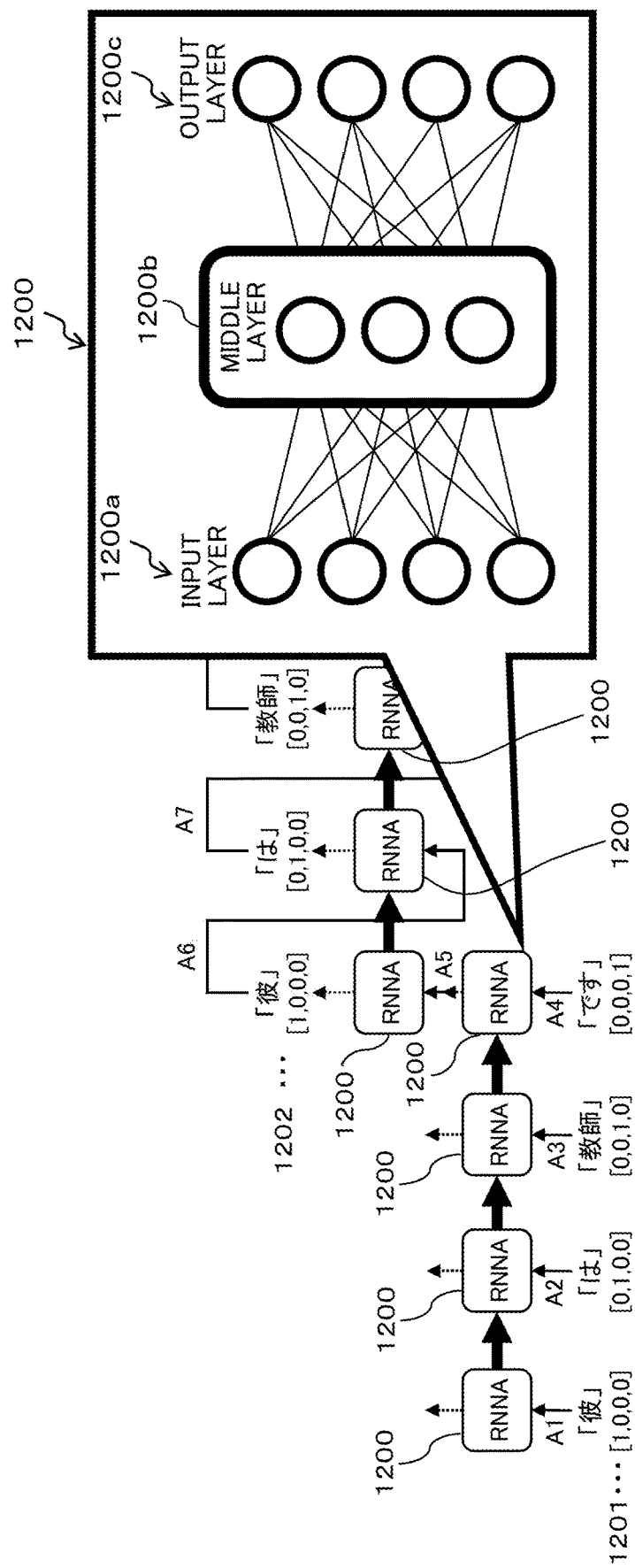
FIG. 5 is a diagram illustrating compressed representation acquirement in an RNN autoencoder according to a comparative example of the embodiment.

For example, an RNN autoencoder 1200 having a three-layered neural network as illustrated in FIG. 5 is configured such that the number of middle layers 1200b is smaller than the number of the input layers 1200a and the output layers 1200c. Note that it is assumed that the "RNNA 1200" of FIG. 5 refers to the entire RNNA. In addition, although a plurality of RNNAs 1200 are illustrated in FIG. 5, these RNNAs 1200 refer to the same RNNA. That is, in the example of FIG. 5, phrases of the sentence are sequentially input to and output from a single RNNA 1200.

Similar to FIG. 2, even when the RNN autoencoder 1200 performs the training of the sentence, the same data such as vectors of each phrase of the sentence are set in the input (input layer 1200a) and the output (output layer 1200c) to perform training. For example, assuming that a sentence "kare wa kyoshi desu." is used in the training, "kare: [1, 0, 0, 0]", "ha: [0, 1, 0, 0]", "kyoshi: [0, 0, 1, 0]", and "desu: [0, 0, 0, 1]" are set in the input and output data 1201 and 1202, respectively.

Since the trained information are compressed in the middle layer 1200b of the RNN autoencoder 1200 after the training as illustrated in FIG. 5, it is possible to acquire information of the compressed sentence by directly acquiring the value of the middle layer 1200b.

However, in the RNN autoencoder 1200 described above, the training is performed by setting the same value in the input data 1201 and the output data 1202. Therefore, the compressed representation of the acquired sentence easily suffers from an error caused by ambiguity of expression. For this reason, Japanese sentences having the same meaning may be erroneously trained as having different meanings.

In this regard, according to an embodiment, a method of reducing influence of ambiguity of language expression when a feature quantity of a sentence such as a compressed representation is obtained by the RNN autoencoder 1200 will be described.

[1-2] Exemplary Functional Configuration of Learning Apparatus of Embodiment

An exemplary functional configuration of the learning apparatus 1 according to an embodiment will be described with reference to FIG. 6.

Figure 6:
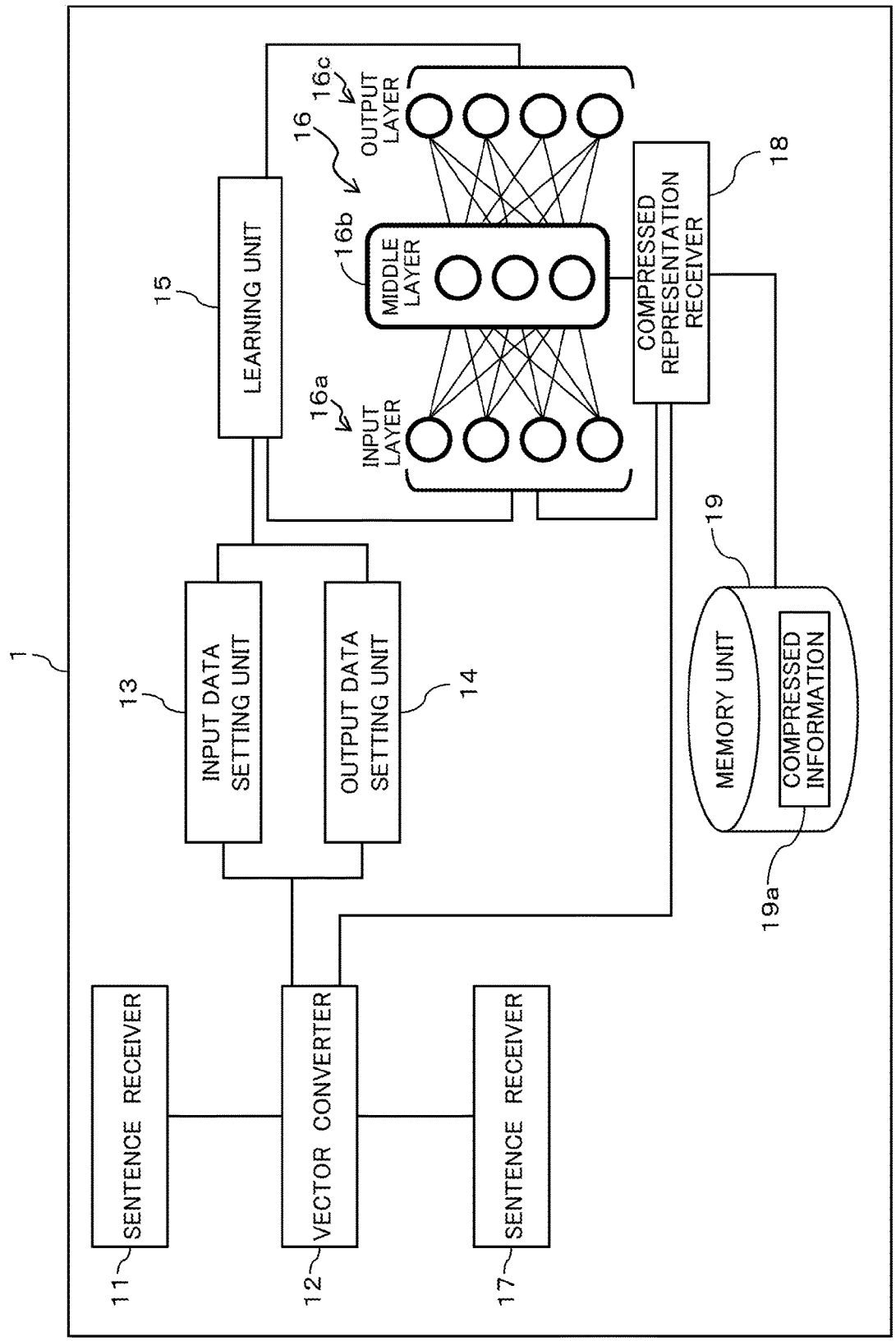
FIG. 6 is a block diagram illustrating an exemplary functional configuration of a learning apparatus according to the embodiment.

As illustrated in FIG. 6, the learning apparatus 1 according to an embodiment may have, for example, a sentence receiver 11, a vector converter 12, an input data setting unit 13, an output data setting unit 14, a learning unit 15, and an RNN autoencoder 16. In addition, the learning apparatus 1 according to an embodiment may have functions as a sentence receiver 17, a compressed representation receiver 18, and a memory unit 19.

The sentence receiver 11 acquires a first sentence as a feature quantity acquirement target and a second sentence obtained by translating the first sentence. In this embodiment, it is assumed that a Japanese sentence is set as an example of the first sentence, and a sentence obtained by translating the Japanese sentence into English (English translation version) is acquired as an example of the second sentence. The Japanese sentence may be stored in a storage device such as a database in advance or may be set by a user or administrator at any time. In a case where the Japanese sentence is set by a user or administrator at any time, the Japanese sentence may be input using an input device such as a mouse, a keyboard, a touch panel, and manipulation buttons included in an I/O unit 20e described below. In addition, the English translation version may be obtained by translating the Japanese sentence using a translation tool or the like at any time or may be set by a user or administrator using the input device or the like as a translation version. Alternatively, a translation version of the Japanese sentence may be stored in a storage device such as a database in advance.

The vector converter 12 receives the Japanese sentence and the English translation version input from the sentence receiver 11 and performs a morphological analysis on the sentences to extract phrases exhibited in the sentences. In addition, each extracted phrase may be vectorized. Although the one-hot technique is employed as a vectorization method in the comparative example, other techniques such as the Bag of Words (BoW) or the word2vec may also be employed. Alternatively, the vector converter 12 may receive a Japanese sentence input from a sentence receiver 17 described below. In addition, the vector converter 12 may perform a morphological analysis on the sentences to extract phrases exhibited in the sentences, and each of the extracted phrases may be vectorized. Note that the word extraction function of the vector converter 12 is an example of a word extraction unit. Furthermore, a configuration having the vectorization function (vector conversion) in the vector converter 12 is an example of a converter.

The input data setting unit 13 receives a vector of the Japanese sentence input from the vector converter 12 and sets the vector in the learning unit 15 as the input data to the RNN autoencoder 16.

The output data setting unit 14 receives the vector of the English translation version input from the vector converter 12 and sets the vector of the English translation version in the learning unit 15 as the output data to the RNN autoencoder 16.

The learning unit 15 sets the vector of the Japanese sentence received from the input data setting unit 13 as the input data of the RNN autoencoder 16 for the RNN autoencoder 16 of the learning apparatus 1. In addition, the learning unit 15 sets the vector of the English translation version received from the output data setting unit 14 as the output data of the RNN autoencoder 16. As a result, the learning unit 15 allows the RNN autoencoder 16 to train the input/output relationship described above.

The sentence receiver 17 may acquire a sentence instead of the input of the Japanese sentence from the sentence receiver 11. A user inputs a Japanese sentence corresponding to a compressed representation that a user desires to acquire. The Japanese sentence may be input by a user using an input device such as a mouse, a keyboard, a touch panel, and manipulation buttons included in the I/O unit 20e described below, or may be read from a storage unit such as a database. The sentence receiver 17 transmits the Japanese sentence to the vector converter 12 for vectorization.

The compressed representation receiver 18 receives, from the vector converter 12, the vector of the sentence of the feature quantity acquirement target such as the Japanese sentence corresponding to the compressed representation that a user desires to acquire. In addition, the compressed representation receiver 18 sets the received vector as the input data of the RNN autoencoder 16 trained by the learning unit 15 (training has been completed). In addition, the compressed representation receiver 18 acquires the compressed representation of the sentence from the middle layer 16b of the RNN autoencoder 16. The compressed representation receiver 18 may store the acquired compressed representation in the memory unit 19 as compressed information 19a or may output the acquired compressed representation to an external software program, a display, or the like. Note that the compressed representation receiver 18 is an example of a feature quantity extraction unit.

The memory unit 19 stores information such as the compressed information 19a. The memory unit 19 may be implemented by at least a part of a storage area of the memory 20b or the storage unit 20c of the computer 20 described below in conjunction with FIG. 7. Alternatively, the compressed information 19a may be used, for example, in calculation of the similarity of sentence in the classification or search of the sentence.

The sentence receiver 11, the input data setting unit 13, the output data setting unit 14, and the learning unit 15 may serve as a functional block of a training phase functioning for the training of the RNN autoencoder 16 inside the learning apparatus 1.

Meanwhile, the sentence receiver 17 and the compressed representation receiver 18 may serve as a functional block of a compressed representation acquirement phase functioning after the training of the RNN autoencoder 16. Alternatively, the vector converter 12 may serve as a functional block functioning in both the training phase and the compressed representation acquirement phase.

[1-3] Exemplary Hardware Configuration of Learning Apparatus of Embodiment

An exemplary hardware configuration of the learning apparatus 1 according to an embodiment will be described with reference to FIG. 7.

Figure 7:
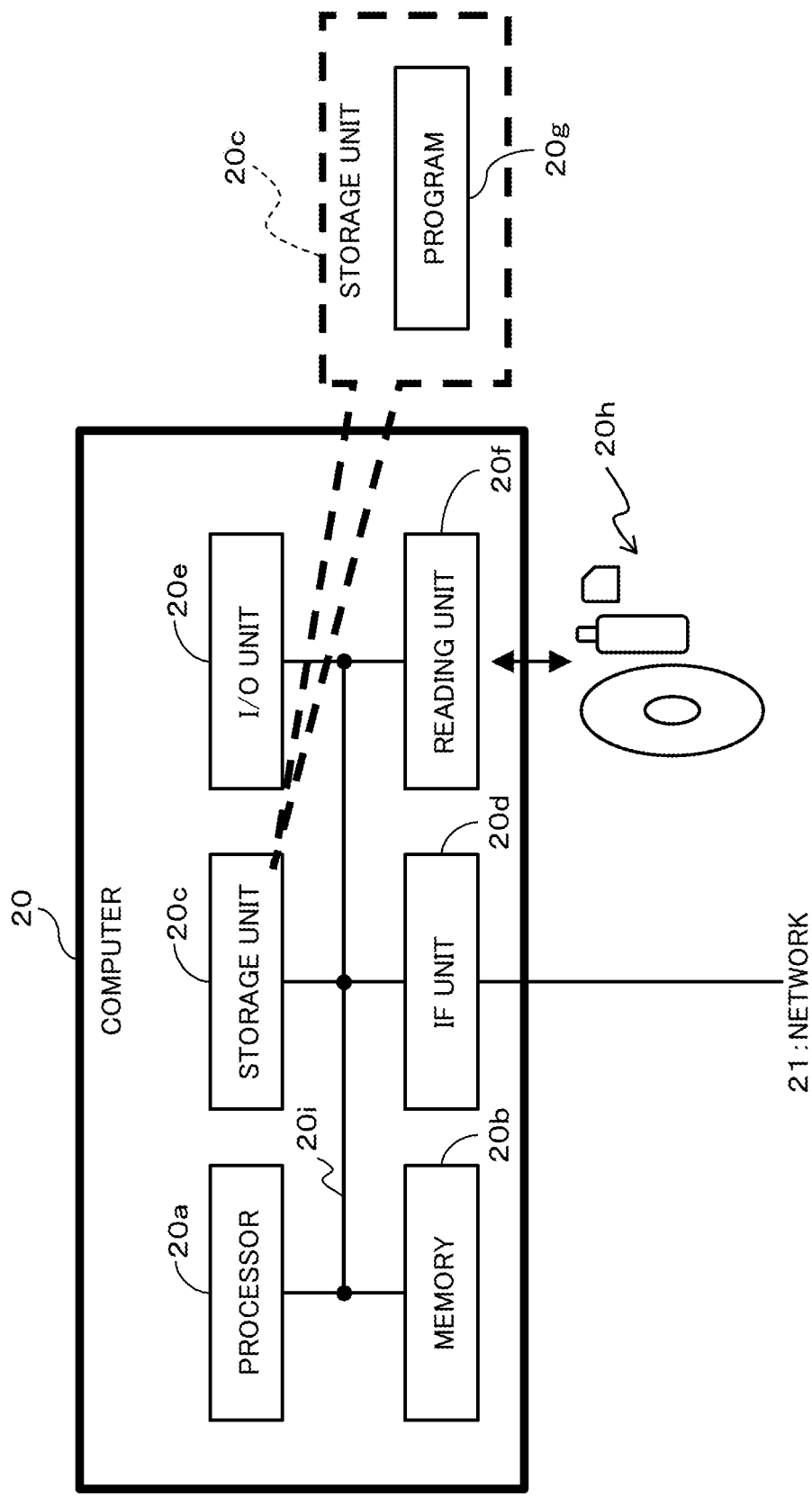
FIG. 7 is a block diagram illustrating an exemplary hardware configuration of the learning apparatus according to the embodiment.

As illustrated in FIG. 7, a computer 20 as an example of the learning apparatus 1 may have, for example, a processor 20a, memory 20b, a storage unit 20c, an interface (IF) unit 20d, an input/output (I/O) unit 20e, and a reading unit 20f.

The processor 20a is an exemplary operation processing device that performs various controls or operations. The processor 20a may be communicatably connected to each block 20b to 20f via a bus 20i. The processor 20a may include an integrated circuit (IC) such as CPU, GPU, MPU, DSP, ASIC, and PLD such as an FPGA. Note that the CPU refers to a central processing unit, the GPU refers to a graphic processing unit, the MPU refers to a micro processing unit, the DSP refers to a digital signal processor, the ASIC refers to an application specific integrated circuit, the PLD refers to a programmable logic device, and the FPGA refers to a field programmable gate array.

The memory 20b is an exemplary hardware component for storing various data or programs. The memory 20b may include a volatile memory or RAM such as a dynamic RAM (DRAM). Note that the RAM refers to a random access memory.

The storage unit 20c is an exemplary hardware component for storing various data or programs. For example, the storage unit 20c may be used as a secondary storage of the computer 20 or may store various programs such as an operating system (OS), firmware, or applications, and various data. The storage unit 20c may include, for example, a magnetic disk device such as a hard disk drive (HDD), a semiconductor drive device such as a solid state drive (SSD), or various memory devices such as a nonvolatile memory. The nonvolatile memory may include, for example, a flash memory, a storage class memory (SCM), a read-only memory (ROM), or the like. The storage unit 20c may store a program 20g for implementing all or a part of various functions of the computer 20.

The IF unit 20d is an exemplary communication interface used to control connection and communication with other devices or the like via the network 21. For example, the IF unit 20d may include an adaptor complying with a standard such as Ethernet (registered trademark) or an optical communication scheme (such as Fibre Channel). Note that the computer 20 may have a communication interface that controls connection and communication with a management terminal of an administrator or the like. Alternatively, the program 20g may be downloaded from the network 21 using the communication interface.

The I/O unit 20e may include, for example, at least one of an input device such as a mouse, a keyboard, a touch panel, or manipulation buttons or an output device such as a display, a projector, and a printer.

The reading unit 20f is an example of a reader that reads the data or program recorded in the recording medium 20h and outputs it to the processor 20a. The reading unit 20f may include a connection terminal or device where the recording medium 20h can be connected or inserted. The reading unit 20f may include an adaptor complying with a standard such as a universal serial bus (USB), a drive device that accesses a recording disc, a card reader that access a flash memory such as an SD card, and the like. Note that the recording medium 20h may store the program 20g and the like.

The recording medium 20h may include, for example, a non-transitory computer-readable recording medium such as a magnetic/optical disc or a flash memory. The magnetic/optical disc may include, for example, a flexible disk, a compact disc (CD), a digital versatile disc (DVD), a blue-ray disc, a holographic versatile disc (HVD), and the like. The flash memory may include, for example, a semiconductor memory such as a USB memory or an SD card. Note that the CD may include, for example, CD-ROM, CD-R, CD-RW, and the like. The DVD may include, for example, DVD-ROM, DVD-RAM, DVD-R, DVD-RW, DVD+R, DVD+RW, and the like.

The aforementioned hardware configuration of the computer 20 is merely for illustrative purposes. Therefore, the number of hardware components of the computer 20 may change (for example, any block may be added or deleted). Any division, combination, or integration may also be possible. In addition, a bus may be added or omitted as appropriate.

[1-4] Input Sentence Table of Embodiment

An input sentence table 6 according to an embodiment will be described with reference to FIG. 8.

According to this embodiment, the sentence receiver 11 of FIG. 6 receives a Japanese sentence and an English translation version of the Japanese sentence. In this case, the Japanese sentence and the English translation version may be stored in, for example, a storage device such as a database, for example, in a table format as illustrated in FIG. 8. The character data in FIG. 8 includes Japanese sentences representing "kare wa kyoshi desu" and "kare wa sensei desu" in Japanese with Japanese Kanji characters, Hiragana characters, and period.

The input sentence table 6 of FIG. 8 has an input sentence identification (ID) field 61, a sentence field 62, and a classification field 63.

The input sentence ID 61 is an ID for uniquely specifying an input sentence read from the outside. In the example of FIG. 8, the input sentence ID 61 is set to "input01", "output01", and the like. In addition, as illustrated in FIG. 8, it assumed that a script "input" is added to a head of the input sentence ID 61 for the Japanese sentence which is a source of the input data of the RNN autoencoder 16 according to this embodiment. In addition, it is assumed that a script "output" is added to a head of the input sentence ID 61 for the English translation version which is source of the output data of the RNN autoencoder 16.

The sentence field 62 stores the input sentence. Here, it is assumed that, in a case where a plurality of sentences are input in series, the sentence receiver 11 divides a single sentence into a plurality of sentences with a single period. In the example of FIG. 8, the sentence field 62 includes sentences "kare wa kyoshi desu", "He is a teacher.", and the like.

The classification field 63 stores "INPUT" if the sentence 62 is a Japanese sentence (for example, if the script "input" is contained in the input sentence ID 61). Meanwhile, the classification field 63 stores "OUTPUT" if the sentence 62 is an English translation version (for example, if the script "output" is contained in the input sentence ID 61).

[1-5] Phrase Table of Embodiment

A phrase table 7 according to an embodiment will be described with reference to FIG. 9. The character data in FIG. 9 includes Japanese Kanji characters, Hiragana characters, and period representing "kare", "wa", "kyoshi", "sensei", "desu" and "." in Japanese.

According to this embodiment, the vector converter 12 of FIG. 6 receives a Japanese sentence and an English translation version input from the sentence receiver 11 or the sentence receiver 17 described below, and extracts phrases exhibited in this sentence by performing a morphological analysis on each sentence. In this case, the extracted phrases may be stored in a storage device such as a database in a table format, for example, as illustrated in FIG. 9.

The phrase table 7 of FIG. 9 has a phrase ID field 71, a phrase field 72, and a classification field 73.

The phrase ID 71 is an ID for uniquely specifying the corresponding phrase. In the example of FIG. 9, the phrase ID 71 is set to "input01", "output01", and the like. In addition, as illustrated in FIG. 9, a script "input" is added to a head of the phrase ID 71 for the phrases of the Japanese sentence which is the input data of the RNN autoencoder 16 according to this embodiment. In addition, a script "output" is added to a head of the phrase ID 71 for the phrases of the English sentence which is the output data of the RNN autoencoder 16.

The phrase field 72 stores the phrases extracted as a result of the morphological analysis of the vector converter 12. In the example of FIG. 9, the phrase field 72 has phrases "kare", "ha", "kyoshi", "desu", and ".", or phrases "He", "is", "a", "teacher", and ".".

The classification field 73 stores "INPUT" if the phrase field 72 has a Japanese phrase (for example, if the phrase ID 71 contains a script "input"). In addition, if the phrase field 72 contains the English translation version (for example, if the phrase ID 71 contains a script "output"), the classification field 73 stores "OUTPUT".

[1-6] Vector Table of Embodiment

A vector table 8 according to an embodiment will be described with reference to FIG. 10. The character data in FIG. 10 includes Japanese Kanji characters, Hiragana characters, and period representing "kare", "wa", "kyoshi", "desu", "." and "sensei" in Japanese.

Figure 10:
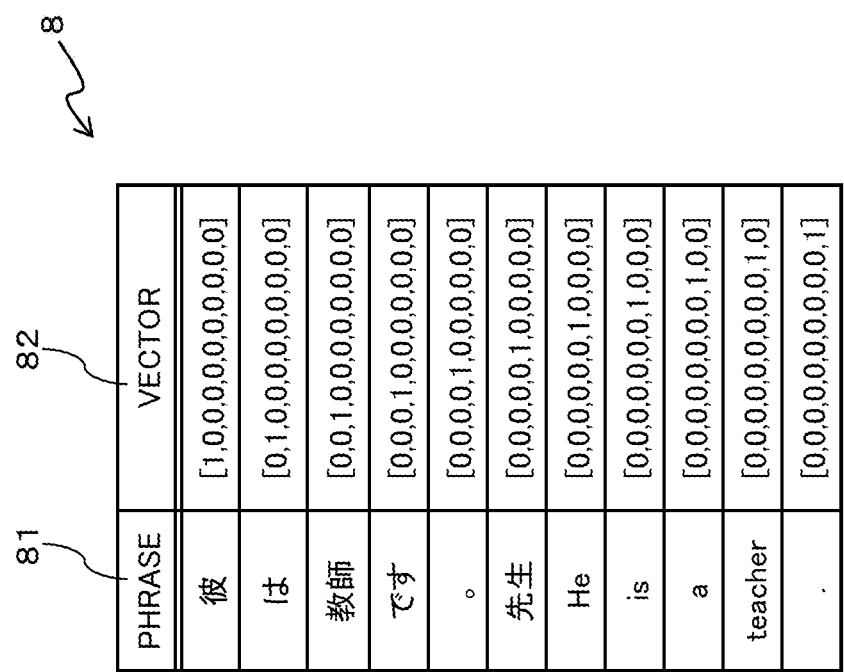
FIG. 10 is a diagram illustrating a result of performing vectorization in the vector converter according to the embodiment.

The vector table 8 of FIG. 10 has a phrase field 81 and a vector field 82.

The phrase field 81 stores each phrase obtained by extracting the phrases exhibited in the Japanese sentence and the English translation version through the morphological analysis of the vector converter 12. The values stored in the phrase field 81 are similar to the phrases contained in the phrase field 72 of the phrase table 7.

The vector field 82 stores the vectors obtained by vectorizing each phrase field 81 using the vector converter 12. In the example of FIG. 10, if the phrase field 81 is set to "kare", the vector field 82 is set to [1, 0, 0, 0, 0, 0, 0, 0, 0, 0, 0]. Here, it is assumed that the one-hot technique is used in the vectorization as an exemplary compression method. In addition, the vectors are merely for illustrative purposes, and the number of digits is not limited to those described above.

[1-7] Sentence Training Using RNN Autoencoder of Embodiment

Next, sentence training using the RNN autoencoder 16 according to this embodiment will be described with reference to FIG. 11. The character data in FIG. 11 includes Japanese Kanji characters, Hiragana characters, and period representing "kare", "wa", "kyoshi", "desu" and "." in Japanese.

Figure 11:
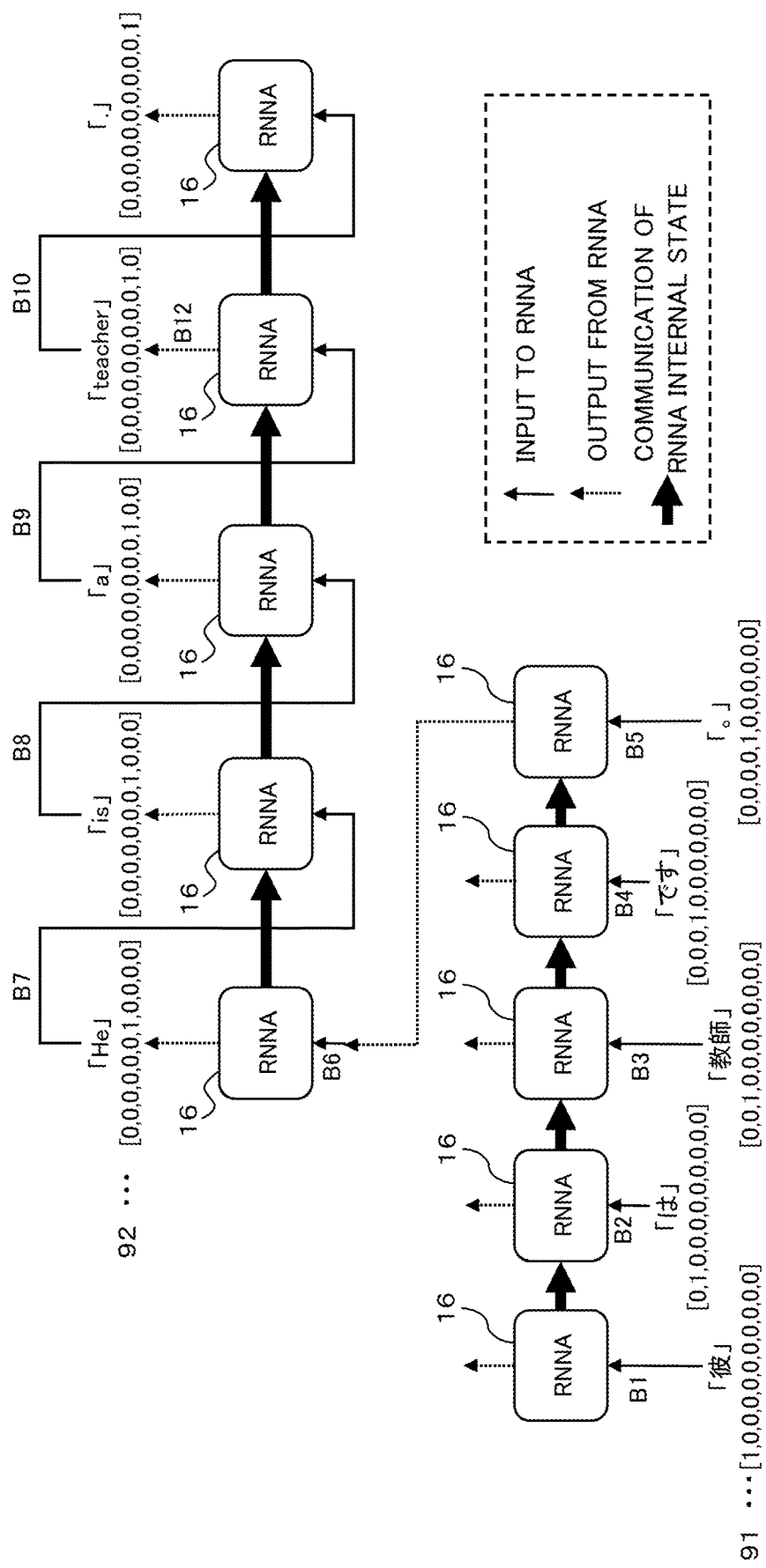
FIG. 11 is a diagram illustrating exemplary input and output values of the RNN autoencoder according to the embodiment.

FIG. 11 illustrates exemplary input and output values of the RNN autoencoder 16 according to this embodiment. Note that it is assumed that the RNNA 16 of FIG. 11 refers to the entire RNNA. In addition, although a plurality of RNNAs 16 are illustrated in FIG. 11, these RNNAs 16 refer to the same RNNA. That is, in the example of FIG. 11, phrases of a sentence are sequentially input to and output from a single RNNA 16.

The input data 91 of the RNN autoencoder 16 is obtained by performing a morphological analysis on a sentence to be trained using the vector converter 12, extracting phrases exhibited in this sentence, and vectorizing each of the extracted phrases. In the example of FIG. 11, in order to allow the RNN autoencoder 16 to train the sentence "kare wa kyoshi desu.", the vector converter 12 performs a morphological analysis on this sentence and extracts phrases "kare", "ha", "kyoshi", "desu", and "." exhibited in this sentence. In addition, the vector converter 12 vectorizes each of the extracted phrases. For example, assuming the one-hot technique is employed as a vectorization method, the extracted phrases are vectorized as follows as illustrated in FIG. 11.

"kare": [1, 0, 0, 0, 0, 0, 0, 0, 0, 0, 0],
"ha": [0, 1, 0, 0, 0, 0, 0, 0, 0, 0, 0],
"kyoshi": [0, 0, 1, 0, 0, 0, 0, 0, 0, 0, 0],
"desu": [0, 0, 0, 1, 0, 0, 0, 0, 0, 0, 0],
".": [0, 0, 0, 0, 1, 0, 0, 0, 0, 0, 0]

The vectors obtained as described above are set as the input data 91 of the RNN autoencoder 16 as illustrated in FIG. 11. Next, a method of obtaining the output data will be described.

The output data 92 to the RNN autoencoder 16 according to this embodiment are obtained by performing a morphological analysis on an English translation version using the vector converter 12, extracting phrases exhibited in the sentence, and vectorizing each of the extracted phrases. In the example of FIG. 11, in order to allow the RNN autoencoder 16 to perform the training such that a sentence "He is a teacher." becomes the output data 92, the vector converter 12 performs the morphological analysis on this sentence. In addition, the vector converter 12 extracts phrases "He", "is", "a", "teacher", and "." exhibited in this sentence and vectorizes each of the extracted phrases. For example, assuming the one-hot technique is employed as the vectorization method, as illustrated in FIG. 11, the extracted phrases are vectorized as follows.

"He": [0, 0, 0, 0, 0, 0, 1, 0, 0, 0, 0],
"is": [0, 0, 0, 0, 0, 0, 0, 1, 0, 0, 0],
"a": [0, 0, 0, 0, 0, 0, 0, 0, 1, 0, 0],
"teacher": [0, 0, 0, 0, 0, 0, 0, 0, 0, 1, 0],
".": [0, 0, 0, 0, 0, 0, 0, 0, 0, 0, 1]

The vectors obtained as described above are set as the output data 92 to the RNN autoencoder 16 as illustrated in FIG. 11.

The RNN autoencoder 16 performs training by setting different values as the input data 91 and the output data 92. Each input data 91 is input to the RNN autoencoder 16 in order of B1, B2, . . . , B10 (refer to the arrows B1 to B10 indicated by the solid lines in FIG. 11). In addition, the RNN autoencoder 16 internally performs the training such that the output data 92 is obtained for the input data 91. Furthermore, the arrows indicated by the dotted lines in FIG. 11 represent the output values for each input data 91, and the training is performed by internally transferring the output values or the like inside the RNN autoencoder 16 (refer to the arrows indicated by the bold lines in FIG. 11).

[1-8] Conversion Parameter of RNN Autoencoder of Embodiment

Figure 12:
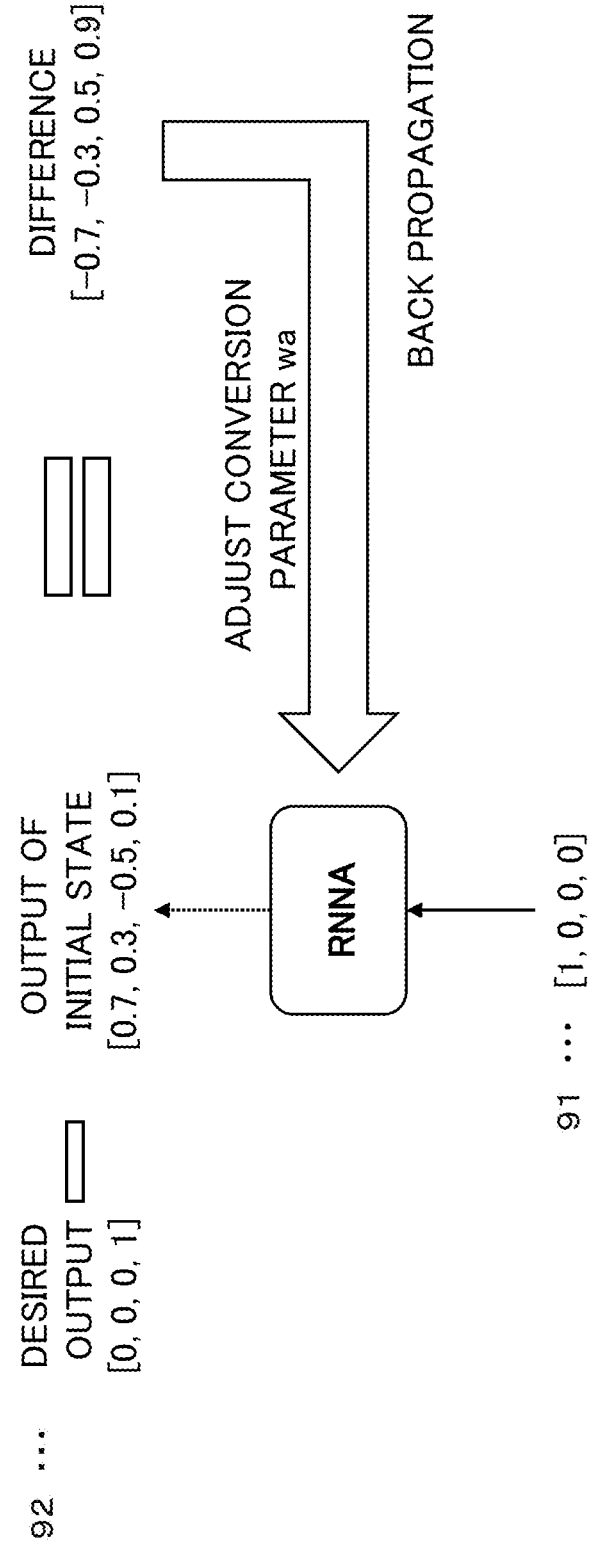
FIG. 12 is a diagram illustrating training of the RNN autoencoder according to the embodiment.

FIG. 12 illustrates the training based on back propagation by extracting a single node of the RNN autoencoder 16 according to an embodiment of FIG. 11.

In the example of FIG. 12, as a vector [1, 0, 0, 0] is set as the input data 91 of the RNN autoencoder 16, a vector [0.7, 0.3, −0.5, 0.1] is obtained as an initial state output 1102. As described above, in the RNN autoencoder 16, the neural network is initialized by a random conversion parameter wa (initial value) before the training. In addition, in order to obtain a desired output data [0, 0, 0, 1], the training is iteratively performed through back propagation based on a difference between the output data 92 and the input data 91, so that the conversion parameter wa is suitably adjusted. Note the desired output data may include "data having a value different from that of the input data 1101" according to this embodiment.

In this manner, a desired input/output relationship is trained by iteratively performing the training as illustrated in FIG. 12. As a result of the training, the conversion parameter wa is suitably adjusted, so that desired output data 92 (the output data 92 having a value different from that of the input data 91) is obtained for the input data 91.

Figure 13:
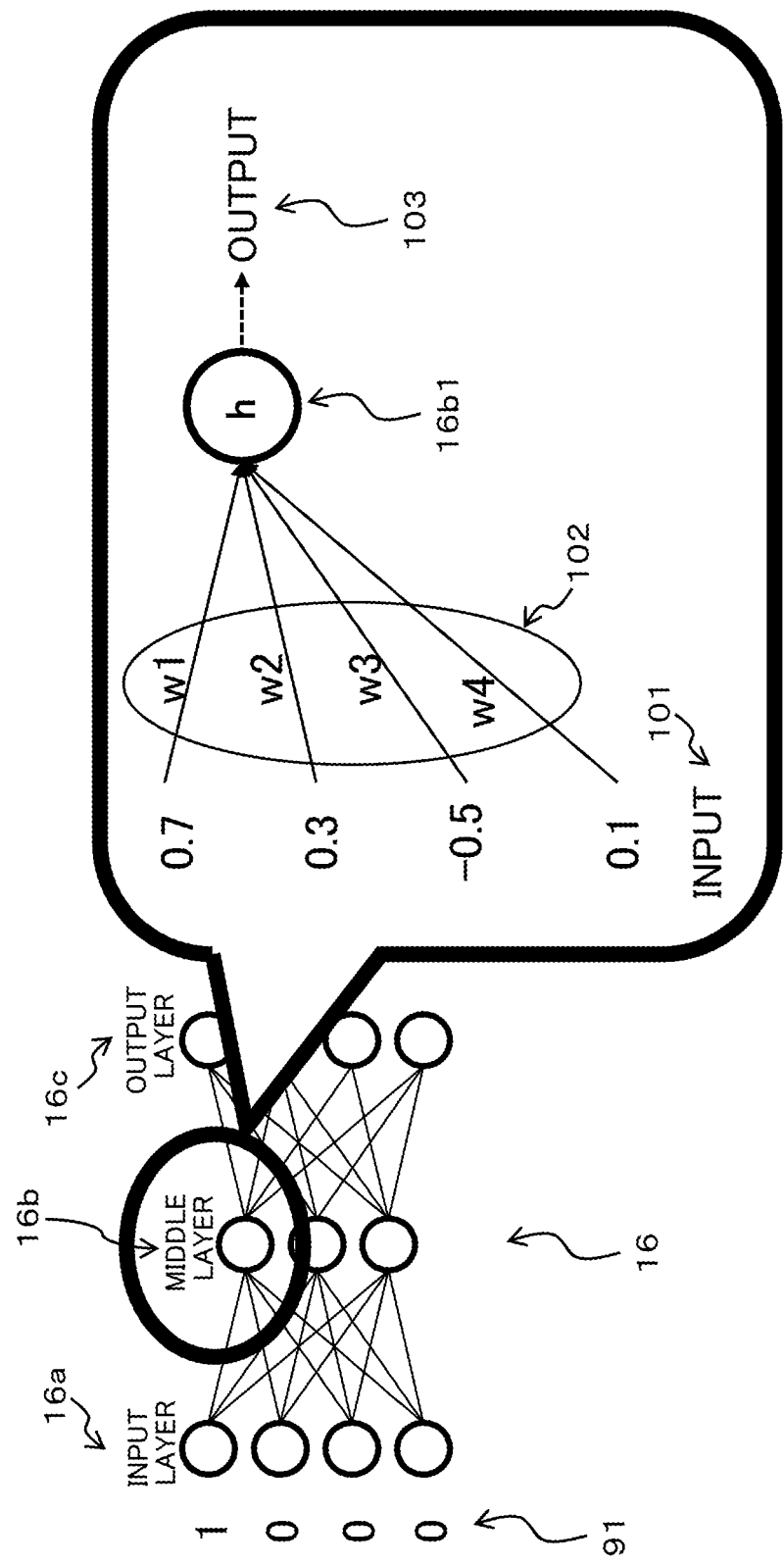
FIG. 13 is a diagram illustrating a conversion parameter and output data of the RNN according to the embodiment.

FIG. 13 is a diagram illustrating conversion parameters (weights) 102 and output data 103 of the RNN autoencoder 16 according to an embodiment.

FIG. 13 is an enlarged view illustrating an exemplary input/output relationship between the input layer 16a and one of the middle layers 16b in the RNN autoencoder 16 after the training. The RNN autoencoder 16 determines suitable conversion parameters 102 for branches linking the input layers 16a and the middle layers 16b by training the input/output relationship between the input layer 16a and one of the middle layers 16b. This enlarged view illustrates that suitable conversion parameters 102 (w1, w2, w3, and w4) are obtained for a single node 16b1 of the middle layer 16b as the RNN autoencoder 16 iteratively performs the training.

FIG. 13 illustrates a case where input data 91 is set in the input layer 16a as [1, 0, 0, 0], and data [0.7, 0.3, −0.5, 0.1] is output from the input layer 16a. In this case, the output value from the input layer 16a becomes the input data 101 to the middle layer 16b. In the middle layer 16b, the input to the node 16b1 of the middle layer 16b is performed considering conversion parameters 102 that are weights of each branch for each of the input data 101. Then, the output is performed considering a value "h" for the node 16b1 of the middle layer 16b. For example, the output data 103 from the node 16b1 of the middle layer 16b is obtained as "{(0.7×w1)+(0.3×w2)+(−0.5×w3)+(0.1×w4)}×h".

[1-9] Operation Example

Next, an operation example of the training phase and the compressed representation acquirement phase using the learning apparatus 1 having the aforementioned configuration will be described.

[1-9-1] Flowchart of Learning Process of Embodiment

An exemplary process for allowing the RNN autoencoder 16 of the learning apparatus 1 according to an embodiment to performing the training will be described with reference to the flowchart (steps S1 to S8) of FIG. 14.

In step S1, the sentence receiver 11 acquires all training target sentences and all translation versions of these sentences. According to this embodiment, it is assumed that the sentence receiver 11 acquires a Japanese sentence and a sentence obtained by translating the Japanese sentence into English (English translation version) and inputs them to the learning apparatus 1. The sentence receiver 11 acquires the sentence and the translation version of the sentence. In this embodiment, it is assumed that a Japanese sentence and a sentence obtained by translating this Japanese sentence into English (English translation version) are acquired. As described above, the Japanese sentence and the English translation version may be acquired in various manners.

In step S2, the vector converter 12 receives the Japanese sentence and the English translation version input from the sentence receiver 11 and performs a morphological analysis on each sentence.

In step S3, the vector converter 12 extracts phrases exhibited in this sentence based on a result of the morphological analysis. In addition, the vector converter 12 vectorizes each of the extracted phrases. Here, techniques such as the one-hot technique, the BoW technique, and the word2vec technique may also be employed as the vectorization method.

In step S4, the input data setting unit 13 receives a vector of the Japanese sentence input from the vector converter 12 and transmits it to the learning unit 15. The learning unit 15 sets the vector of the Japanese sentence received from the input data setting unit 13 as the input data 91 of the RNN autoencoder 16 for the RNN autoencoder 16 of the learning apparatus 1.

In step S5, the output data setting unit 14 receives a vector of the English translation version input from the vector converter 12 and transmits it to the learning unit 15. The learning unit 15 sets the vector of the English translation version received from the output data setting unit 14 as the output data 92 of the RNN autoencoder 16.

In step S6, the learning unit 15 allows the RNN autoencoder 16 to train the relationship between the input data 91 and the output data 92 described above.

In step S7, the learning unit 15 determines whether or not a sentence to be trained by the RNN autoencoder 16 still remains. If a sentence to be trained by the RNN autoencoder 16 still remains (Yes in step S7), the learning unit 15 controls the RNN autoencoder 16 so as to repeat setting of the input data 91 in the input data setting unit 13 (step S4). If a sentence to be trained by the RNN autoencoder 16 does not remain (No in step S7), the process advances to step S8.

In step S8, the learning unit 15 determines whether or not the training of the RNN autoencoder 16 is converged. If it is determined that the training of the RNN autoencoder 16 is converged (Yes in step S8), the control is performed so as to terminate the training process of the RNN autoencoder 16, and the process is terminated. If it is determined that the training of the RNN autoencoder 16 is not converged (No in step S8), the learning unit 15 performs the control so as to repeat the training process (step S1 to S7) of the RNN autoencoder 16.

Figure 14:
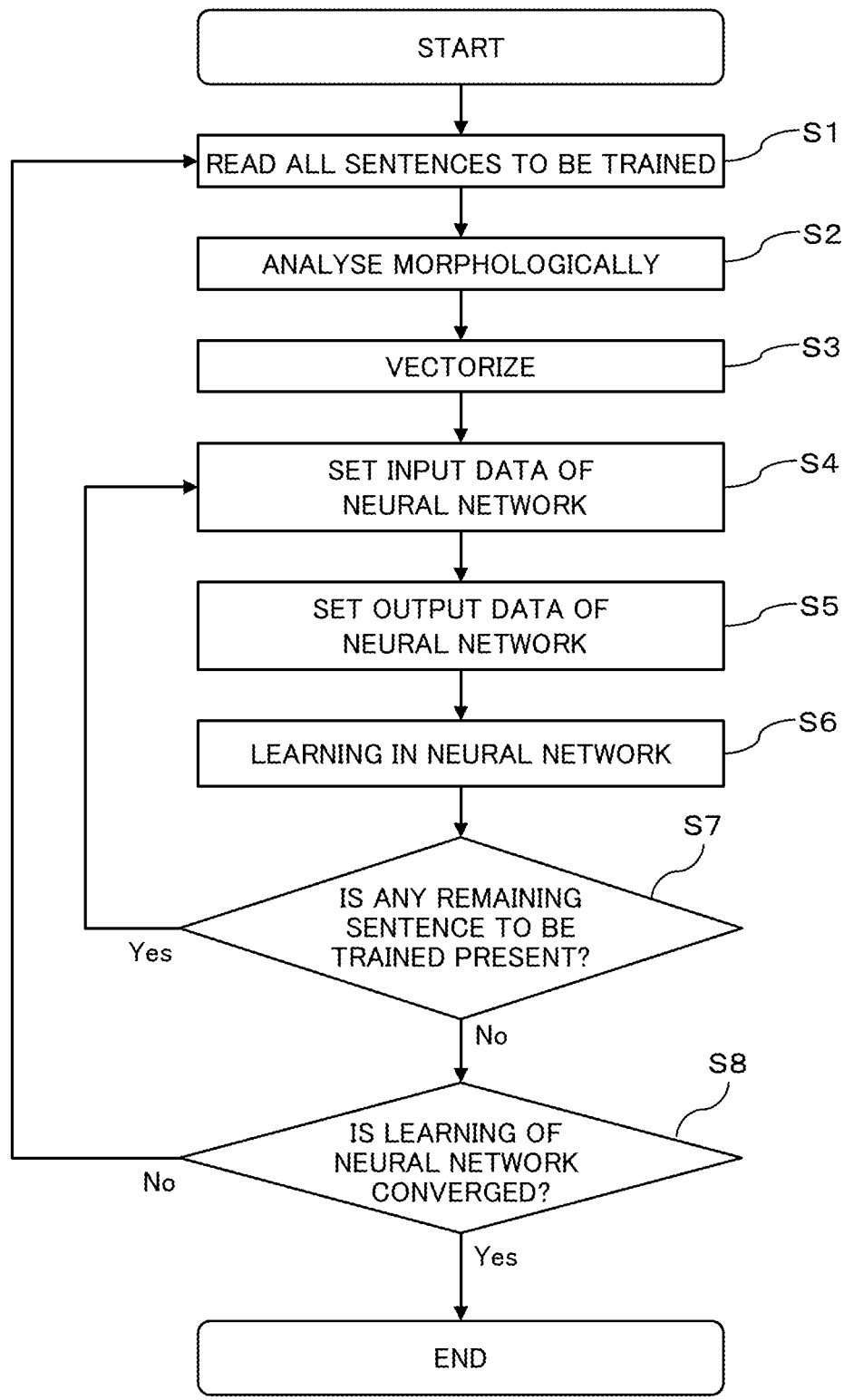
FIG. 14 is a flowchart illustrating an exemplary training process according to the embodiment.

In this manner, the learning apparatus 1 according to this embodiment allows the internal RNN autoencoder 16 to perform the process of FIG. 14 to train the input/output relationship between the input data 91 (Japanese sentence) and the output data 92 (English translation version) having an expression different from that of the input data (Japanese sentence) but having the same meaning. By performing the training in this manner, it is possible to set the conversion parameter 102 of the RNN autoencoder 16 to an optimum value.

Figure 15:
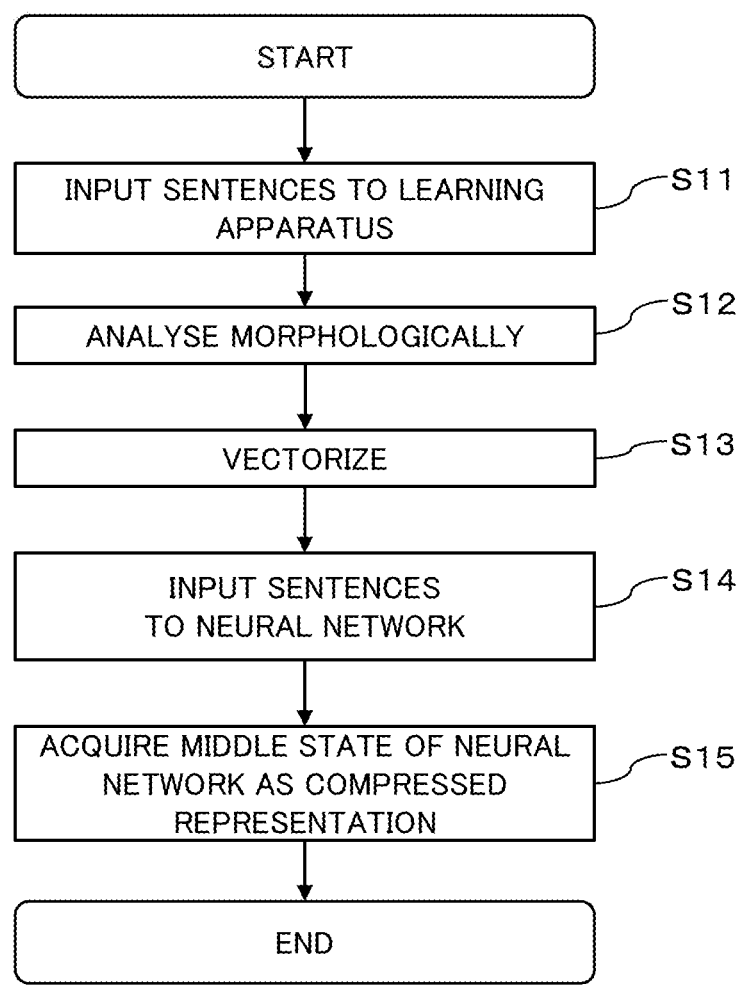
FIG. 15 is a flowchart illustrating an exemplary compressed representation acquirement process according to the embodiment.

[1-9-2] Flowchart for Describing Compressed Representation Acquirement Process of Embodiment An exemplary process for acquiring a compressed representation using an RNN autoencoder 16 after the training through the training process of FIG. 14 in the learning apparatus 1 according to an embodiment will be described with reference to the flowchart (steps S11 to S15) of FIG. 15.

In step S11, the sentence receiver 17 receives an input of a Japanese sentence corresponding to a compressed representation that a user desires to acquire, that is, a feature quantity acquirement target sentence. The Japanese sentence may be input by a user using an input device such as a mouse, a keyboard, a touch panel, and manipulation buttons included in the I/O unit 20e or may be read from a storage device such as a database.

In step S12, the vector converter 12 receives the Japanese sentence acquired by the sentence receiver 17 in step S11 and performs a morphological analysis on this sentence to extract phrases exhibited in the sentence.

In step S13, the vector converter 12 vectorizes each of the extracted phrases in step S12.

In step S14, the input data setting unit 13 receives, from the vector converter 12, a vector of the Japanese sentence corresponding to the compressed representation that a user desires to acquire, and sets the vector as the input data 91 of the RNN autoencoder 16 after the training of the learning unit 15 (training has been completed).

In step S15, the compressed representation receiver 18 acquires the compressed representation of the sentence from the middle layer 16b of the RNN autoencoder 16 after the training, and the process is terminated. Note that the compressed representation receiver 18 may store the acquired compressed representation in a storage device such as a database or may output it to an external software program, a display, or the like.

As described above, using the learning apparatus 1 according to this embodiment, it is possible to generate a conversion parameter corresponding to the meaning of the word contained in the received sentence. In addition, instead of a translation for each word, a translation version of the sentence of the input side is employed as a second sentence. Therefore, it is possible to specify the meanings of each word contained in the translation version.

Therefore, it is possible to reduce influence from ambiguity of language expression when a feature quantity of a language sentence using the RNN autoencoder 16 is obtained. As a result, it is possible to improve accuracy in a natural language processing task such as classification or search of a sentence.

Inside the learning apparatus 1 according to this embodiment, the RNN autoencoder 16 is employed as a neural network. Therefore, it is possible to set the number of middle layers 16b to be smaller than the number of input layers 16a.

Therefore, it is possible to obtain a compressed representation for a desired input data 91 by performing the process as illustrated in FIG. 14.

In the learning apparatus 1, It is possible to acquire the output data 92 (English translation versions) having different expressions but having the same meaning as that of the input data 91 (Japanese sentence) by using the RNN autoencoder 16 in which the conversion parameter 102 is optimally set.

[2] Other Examples

The technology according to the embodiment described above may be modified or changed as described below.

Although the RNN autoencoder 16 has the input data 91 set as a Japanese sentence and the output data 92 set as an English translation version in the embodiment described above, the invention is not limited thereto.

A language used by a user of the learning apparatus 1, that is, a descriptive language for a feature quantity acquirement target sentence may also be selected as the first language. Note that, considering a relationship between the first and second languages, a language having ambiguity of expression more serious than that of the second language, such as a language having a plurality of expressions for a specific meaning (having large vocabulary), may be selected as the first language.

As the second language, a language having ambiguity of expression less serious than that of the first language, such as a language having a small number of expressions for a specific meaning (small vocabulary), may be selected. Note that the second language may be selected depending on a field of the feature quantity acquirement target sentence. For example, a level of the ambiguity of expression of the language may be determined for every specific field instead of all of the languages.

Therefore, a combination of the first and second languages (input/output data of the RNN autoencoder 16) according to the embodiment may be reversed. Alternatively, various languages other than the Japanese or English language may also be combined.

Although a training target read from the outside to the RNN autoencoder 16 is a sentence in the aforementioned embodiment, the phrase or the vector of the phrase may also be read from the outside. In a case where the phrases are read, the vectors of the phrases become the input data 91 to the RNN autoencoder 16.

The morphological analysis and the vectorization of the vector converter 12 may be executed distributedly in separate components.

The input data setting unit 13 and the output data setting unit 14 may be integrated with each other.

Although the compressed representation receiver 18 has a different configuration from that of the sentence receiver 11 in the aforementioned embodiment, the sentence receiver 11 may also execute the process of the compressed representation receiver 18.

Although the RNN autoencoder 16 is employed as a learning machine in the aforementioned embodiment, the invention may also be applied to a neural network having the number of the middle layers 16b smaller than the number of the input layers 16a.

According to an aspect, it is possible to reduce influence from ambiguity of language expression when a feature quantity of a language sentence is obtained through machine learning.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a learning program for causing a computer to execute a process comprising:

receiving a first sentence expressed in a first language and a second sentence obtained by translating the first sentence;

training conversion parameters configured to convert each word of the first sentence into a corresponding word of the second sentence by utilizing machine learning; and vectorizing the first sentence into a vector based on trained conversion parameters.

2. The non-transitory computer-readable recording medium according to claim 1, the process further comprising performing a morphological analysis on the first sentence and the second sentence to extract each word included in the first sentence and the second sentence, wherein the training trains the conversion parameters based on extracted words.

3. The non-transitory computer-readable recording medium according to claim 2, the process further comprising acquiring vectors of each word by vectorizing the extracted words, wherein the training trains the conversion parameters based on acquired vectors.

4. The non-transitory computer-readable recording medium according to claim 3, wherein the training trains the conversion parameters by setting the vectors of the words extracted from the first sentence as an input and by setting the vectors of the words extracted from the second sentence as an output corresponding to the input.

5. A learning method comprising:

receiving a first sentence expressed in a first language and a second sentence obtained by translating the first sentence by a processor;

training by the processor conversion parameters configured to convert each word of the first sentence into a corresponding word of the second sentence by utilizing machine learning; and vectorizing the first sentence into a vector based on trained conversion parameters.

6. The learning method according to claim 5, wherein the processor performs a morphological analysis on the first sentence and the second sentence to extract each word included in the first sentence and the second sentence and trains the conversion parameters based on extracted words.

7. The learning method according to claim 6, wherein the processor acquires vectors of each word by vectorizing the extracted words, and trains the conversion parameters based on acquired vectors.

8. The learning method according to claim 7, where the processor trains the conversion parameters by setting the vectors of the words extracted from the first sentence as an input and by setting the vectors of the words extracted from the second sentence as an output corresponding to the input.

9. A learning apparatus comprising:

a memory; and a processor coupled to the memory, the processor being configured to:

receive a first sentence expressed in a first language and a second sentence obtained by translating the first sentence, train conversion parameters configured to convert each word of the first sentence into a corresponding word of the second sentence by utilizing machine learning, and vectorize the first sentence into a vector based on trained conversion parameters.

10. The learning apparatus according to claim 9, wherein the processor performs a morphological analysis on the first sentence and the second sentence to extract each word included in the first sentence and the second sentence and trains the conversion parameters based on extracted words.

11. The learning apparatus according to claim 10, wherein the processor acquires vectors of each word by vectorizing the extracted words and trains the conversion parameters based on acquired vectors.

12. The learning apparatus according to claim 11, wherein the processor trains the conversion parameters by setting the vectors of the words extracted from the first sentence as an input and by setting the vectors of the words extracted from the second sentence as an output corresponding to the input.

* * * * *